June 7, 1927.                F. GREENLEE                1,631,412
              DIRIGIBLE HEADLIGHT CONSTRUCTION FOR AUTOMOBILES
                          Filed Oct. 7, 1926
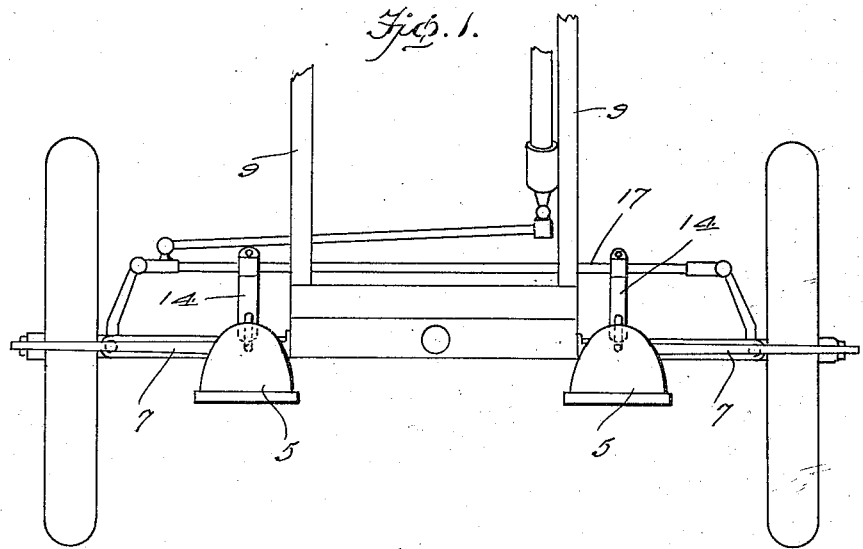
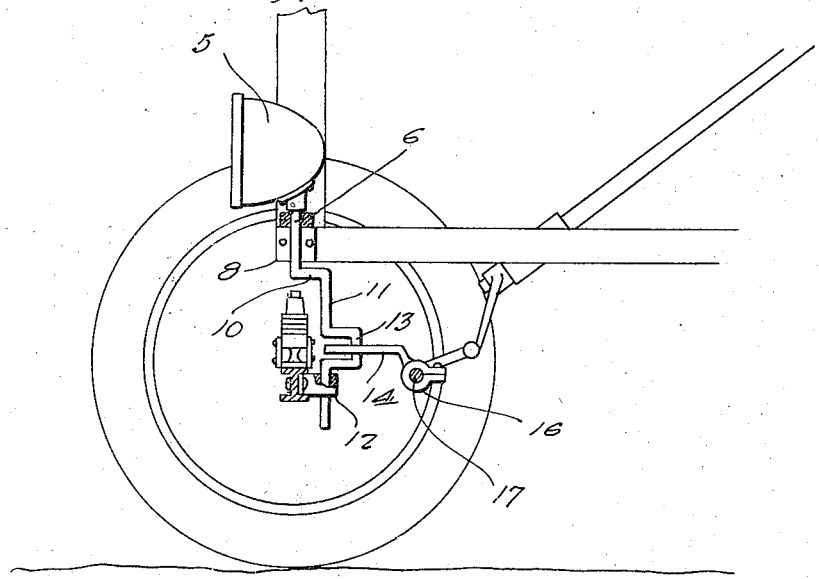
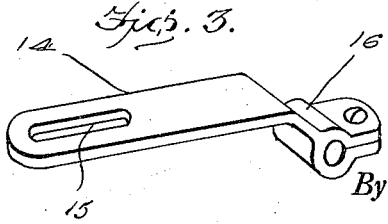
Inventor
Fred Greenlee
By Clarence A. O'Brien
Attorney Patented June 7, 1927.

1,631,412

UNITED STATES PATENT OFFICE.

FRED GREENLEE, OF GALLIA, OHIO.

DIRIGIBLE HEADLIGHT CONSTRUCTION FOR AUTOMOBILES.

Application filed October 7, 1926. Serial No. 140,110.

This invention relates to new and useful improvements in automobile headlights and has more particular reference to a headlight construction that consists of a pair of lights mounted at the front end of an automobile in such a manner and so connected to the steering mechanism of the machine that the lights will be directed in the path of travel of the car at all times.

One of the main objects of the invention is to substantially improve and simplify headlight constructions of this general type.

Other objects and advantages will become apparent as the description of the invention proceeds and when taken in connection with the accompanying drawing.

In the accompanying drawing wherein like numerals indicate like parts:

Figure 1 is a fragmentary top plan of the front end of an automobile equipped with my improved dirigible headlight construction.

Figure 2 is a vertical section through the front end of the automobile for disclosing more clearly the manner of mounting the headlights, and Figure 3 is a perspective of a connecting member between the automobile steering mechanism connecting rod and one of the headlight supporting shafts.

Now having particular reference to the drawing, 5—5 designates a pair of conventional headlights each mounted upon the upper end of a shaft 6 that is journaled through registering openings in a headlight and fender supporting arm 7 and the cross bar 8 at the front of the usual vehicle chassis bar 9—9.

Beneath said cross bar of the vehicle frame each shaft 6 is extended rearwardly as at 10 and thence downwardly as at 11, said portion 11 extending vertically in back of the vehicle supporting spring as well as the axle of the car as clearly disclosed in Figure 2. The lower end of each shaft 6 is journaled through a bearing 12 secured to said axle at the rear side thereof, while directly above the bearing 12 each shaft is formed with a rearwardly extending crank portion 13.

The invention further consists of a pair of connecting arms 14—14, the front ends of which are formed in each instance with a longitudinal slot 15 for receiving the crank portion 13 of the respective shaft 6, the rear end of each of said connecting arms being offset downwardly and thence formed with a split clamp 16 for attachment to the connecting rod 17 of the vehicle steering mechanism as clearly disclosed in both Figures 1 and 2.

It will thus be seen that as the connecting rod 17 is moved longitudinally in opposite directions during the turning of the vehicle wheels, the connecting arms 14—14 will be likewise moved and by reason of their connection with the crank portion 13 of the lamp supporting shafts 6 said shafts will be caused to rotate for moving the headlights 5—5 in the same direction as the front steering wheels of the car so that the light rays will be directed in the path of travel of the vehicle.

While I have shown the preferred embodiment of my invention, it is to be understood that various changes in the size, shape, and arrangement of parts may be resorted to without departing from the spirit of the invention and the scope of the appended claim.

Having thus described the invention, what I claim as new and desire to secure by Letters Patent is:—

In a dirigible headlight construction for automobiles, the combination with the frame, the cross bar extending across the forward end of the frame, the front axle and the transverse connecting rod of the steering mechanism, a shaft mounted vertically for rotation at the front of the automobile, bearings arranged upon the top of the cross bar and the inner side of the front axle, the upper portion of said shaft extending through the cross bar and through the upper bearing, the lower end of the shaft being journaled in the lower bearing on the front axle, a headlight secured on the upper end of the shaft, the portion of the shaft below the cross bar being directed rearwardly and then downwardly, the lower portion of the shaft being bent to form a rearwardly extending crank at a point slightly above the front axle, a connecting arm between the crank and the connecting rod of the steering mechanism, said arm being formed at its inner end with split clamping means for engagement with the connecting rod, the forward end of the arm being formed with a longitudinal slot for receiving the crank portion of the shaft.

In testimony whereof I affix my signature.

FRED GREENLEE.